(12) United States Patent
Smith

(10) Patent No.: US 10,618,809 B2
(45) Date of Patent: *Apr. 14, 2020

(54) SULFUR TRAP

(71) Applicant: Strom W. Smith, Gulfport, MS (US)

(72) Inventor: Strom W. Smith, Gulfport, MS (US)

(*) Notice: Subject to any disclaimer, the term of this patent is extended or adjusted under 35 U.S.C. 154(b) by 127 days.

This patent is subject to a terminal disclaimer.

(21) Appl. No.: 15/708,996

(22) Filed: Sep. 19, 2017

(65) Prior Publication Data

US 2018/0002177 A1     Jan. 4, 2018

Related U.S. Application Data

(60) Continuation of application No. 14/926,262, filed on Oct. 29, 2015, now Pat. No. 9,796,588, which is a division of application No. 13/759,317, filed on Feb. 5, 2013, now Pat. No. 9,216,372.

(60) Provisional application No. 61/595,205, filed on Feb. 6, 2012.

(51) Int. Cl.

| | |
|---|---|
| *B01D 46/46* | (2006.01) |
| *C01B 17/02* | (2006.01) |
| *B01D 46/00* | (2006.01) |
| *F01N 3/20* | (2006.01) |
| *B01D 53/62* | (2006.01) |

(52) U.S. Cl.
CPC ........ *C01B 17/021* (2013.01); *B01D 46/0039* (2013.01); *B01D 53/62* (2013.01); *B01D 2257/30* (2013.01); *B01D 2257/404* (2013.01); *B01D 2257/504* (2013.01); *F01N 3/2066* (2013.01); *F01N 2610/02* (2013.01)

(58) Field of Classification Search
CPC .............. C01B 17/021; B01D 2257/30; B01D 2257/504; B01D 2257/404; B01D 53/62; B01D 46/0039; F01N 3/2066; F01N 2610/02

See application file for complete search history.

(56) References Cited

U.S. PATENT DOCUMENTS

| | | | | |
|---|---|---|---|---|
| 1,413,160 A | * | 4/1922 | Dickey ................... | C10G 7/00 55/423 |
| 1,432,221 A | * | 10/1922 | Trumble ................. | E21B 43/34 137/193 |
| RE15,580 E | * | 4/1923 | Trumble ................. | E21B 43/34 137/193 |

(Continued)

*Primary Examiner* — Dung H Bui
(74) *Attorney, Agent, or Firm* — Keeling Law, LLC; Kenneth A. Keeling; Mark S. Solomon

(57) ABSTRACT

A sulfur trap provides separation of elemental molten sulfur from a process stream comprising a mixture of sulfur and associated tail-gases. The sulfur trap comprises a vertically-oriented cylindrical wall having a chamber for receiving the process stream, a float positioned in the chamber, the float attached to a float end of a lever, a nozzle insert attached to the distal end of the lever, and a lever fulcrum positioned intermediate the lever float end and the lever nozzle insert end. The float, lever, nozzle insert and outlet are constructed to allow the float position to control nozzle insert engagement of the outlet, particularly to close the outlet when the float is elevated by molten sulfur and to disengage from the outlet to allow discharge flow of liquid sulfur at a determined level of sulfur within the chamber. Embodiments of a method of separating liquid sulfur from gases are also provided.

14 Claims, 5 Drawing Sheets

(56) References Cited

U.S. PATENT DOCUMENTS

| | | | | | |
|---|---|---|---|---|---|
| 1,825,990 | A | * | 10/1931 | Aland | F01B 25/00 96/409 |
| 1,926,262 | A | * | 9/1933 | Campbell | B01D 45/08 55/324 |
| 2,037,245 | A | * | 4/1936 | Leifheit | E21B 43/34 96/159 |
| 2,193,209 | A | * | 3/1940 | Sandberg | B01D 45/16 96/409 |
| 2,239,990 | A | * | 4/1941 | Glenn | B01D 45/02 55/410 |
| 2,278,002 | A | * | 3/1942 | Thompson | F16K 31/34 137/414 |
| 2,510,049 | A | * | 5/1950 | Neeson | F16T 1/24 55/333 |
| 2,608,269 | A | * | 8/1952 | Briggs | F25B 43/02 96/109 |
| 2,689,623 | A | * | 9/1954 | Schebler | B01D 45/08 96/409 |
| 2,760,596 | A | * | 8/1956 | Kellie | F16T 1/24 96/409 |
| 3,273,716 | A | * | 9/1966 | Kennepohl | B01D 35/005 210/120 |
| 3,344,439 | A | * | 10/1967 | Davies | E03D 1/145 4/326 |
| 3,893,470 | A | * | 7/1975 | MacPhee | G05D 9/12 137/101.27 |
| 5,067,180 | A | * | 11/1991 | Figeroid | E03D 1/145 4/326 |
| 5,533,545 | A | * | 7/1996 | Robinson | F16K 31/088 137/195 |
| 2004/0111825 | A1 | * | 6/2004 | Kaufman | A47L 5/365 15/353 |

* cited by examiner

SULFUR TRAP

CROSS-REFERENCE TO RELATED APPLICATIONS

This application is a continuation application of copending U.S. patent application Ser. No. 14/926,262, filed on Oct. 29, 2015, which is a divisional application of U.S. patent application Ser. No. 13/759,317, filed on Feb. 5, 2013, which application claims the benefit of U.S. Provisional Patent Application No. 61/595,205, filed on Feb. 6, 2012, all of which applications are incorporated herein by reference in their entirety as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention relates to equipment for separating liquids from associated gases in liquid-gas mixtures. More particularly, the present invention is directed to separation of molten sulfur from process streams having sulfur and gas mixtures, such as oil refineries.

Description of the Related Art

Many industrial operations require separation of liquids from associated gases in two-phase mixtures. For example, gaseous compounds containing sulfur, such as hydrogen sulfide, mercaptans, carbonyl sulfide, and carbon disulfide, exist in natural gas. Such gaseous compounds are produced as by-products in petroleum refining operations. Because sulfur has many useful applications and can most easily be transported in molten form, it is often necessary to separate the molten liquid sulfur from associated gases.

In industrial applications, gas streams containing sulfur compounds are processed to remove sulfur (primarily in the form of hydrogen sulfide). The gas streams are then further processed to form liquid sulfur in sulfur recovery units.

Conventional sulfur recovery units include a seal leg or trapping device to separate molten sulfur from the gas stream. The molten sulfur is condensed from the remaining gas stream.

Sulfur traps associated with sulfur recovery units, as historically practice, include two concentrically arranged vertical pipes. The vertical pipes may extend approximately twenty feet to twenty-five feet into the ground. Process stream was introduced into the inner pipe and molten sulfur was discharged from the outer pipe. The annular arrangement of the inner pipe and outer pipe provided a sulfur trap preventing tail gases from being discharged with the molten sulfur.

U.S. Pat. No. 5,498,270 to the present inventor discloses a sulfur trap that includes a spherical float in an upper chamber, a cylinder having a horizontal opening to a lower sulfur discharge chamber, and guides. The float is disengaged from the cylinder when floating in liquid sulfur and seals the cylinder opening at low levels of liquid sulfur.

U.S. Pat. No. 7,112,308 to the present inventor discloses a sealing device for a sulfur trap with a float, together with a counterweight and a cleaning rod to reduce solid sulfur buildup.

A jacket is commonly provided outside conventional sulfur traps, with steam circulated between the jacket and the outer sulfur trap surfaces to maintain the temperature of the sulfur trap at a level to maintain the sulfur in a liquid phase.

BRIEF SUMMARY OF THE INVENTION

A sulfur trap provides separation of liquid sulfur from a process stream comprising a mixture of sulfur and associated tail-gases. The sulfur trap comprises a vertically-oriented cylinder 1 having a chamber for receiving the process stream, a float positioned in the chamber, the float attached to a float end of a lever, a nozzle insert attached to the distal end of the lever, and a lever fulcrum positioned intermediate the lever float end and the lever nozzle insert end. The float, lever, nozzle insert and outlet are constructed to allow the float position to control nozzle insert engagement of the outlet, particularly to close the outlet when the float is not elevated by liquid sulfur and to disengage from the outlet to allow discharge flow of liquid sulfur at a determined level of sulfur within the chamber.

DETAILED DESCRIPTION OF EXEMPLARY EMBODIMENTS OF THE INVENTION

First Exemplary Embodiment

Figure 1:
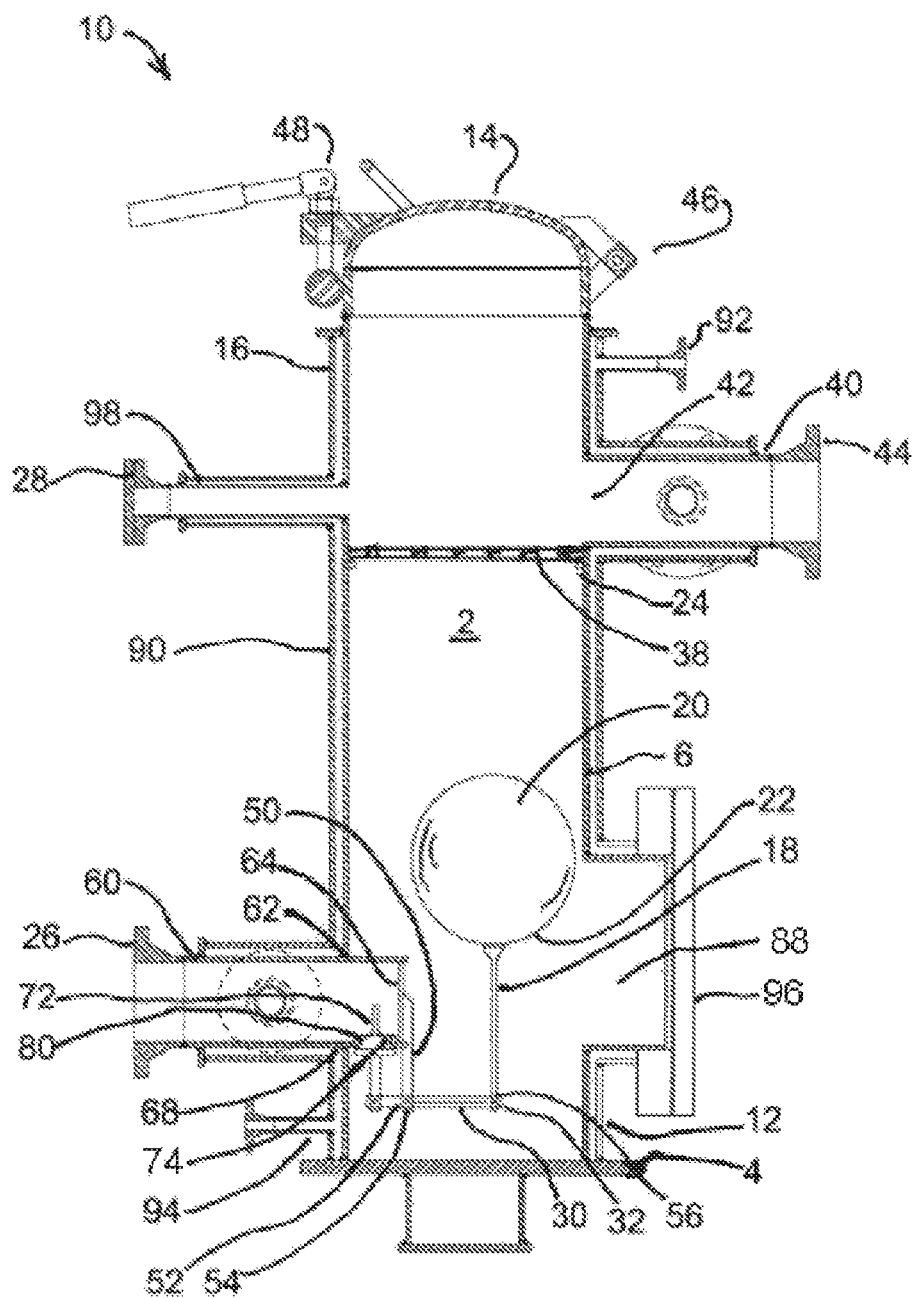
FIG. 1 depicts a partial cross-sectional view of an embodiment of the sulfur trap of the present invention with the stopple in a closed position.

Referring first to FIG. 1, the sulfur trap 10 of the present invention is depicted in a cross-sectional drawing. The sulfur trap 10 includes a chamber 2 having a chamber bottom 4 and a vertically oriented, chamber wall 6. In an exemplary embodiment, chamber wall 6 is cylindrical.

A cap 14 seals the upper end 16 of chamber 2. Cap hinge 46 and cap latch 48 allow for selective opening and closing of cap 14.

A process stream inlet pipe 40 is connected to chamber 2 at inlet opening 42 near upper end 16 of chamber wall 6. Inlet opening 42 is connected to inlet pipe 40 to allow fluid communication from inlet pipe 40 to chamber 2. Inlet pipe 40 is connected to an inlet pipe flange 44. Inlet pipe flange 44 is structured for connection to a process stream line (not shown).

An outlet opening 62 is provided in a lower area 12 of chamber wall 6. A liquid sulfur outlet pipe 60 extends through outlet opening 62 into chamber 2 in the lower area 12 of chamber wall 6. Outlet pipe 60 has a closed pipe end 64 within chamber 2. A flange 26 is provided on outlet pipe 60 to allow connection of outlet pipe 60 to other discharge piping (not shown).

Figure 2:
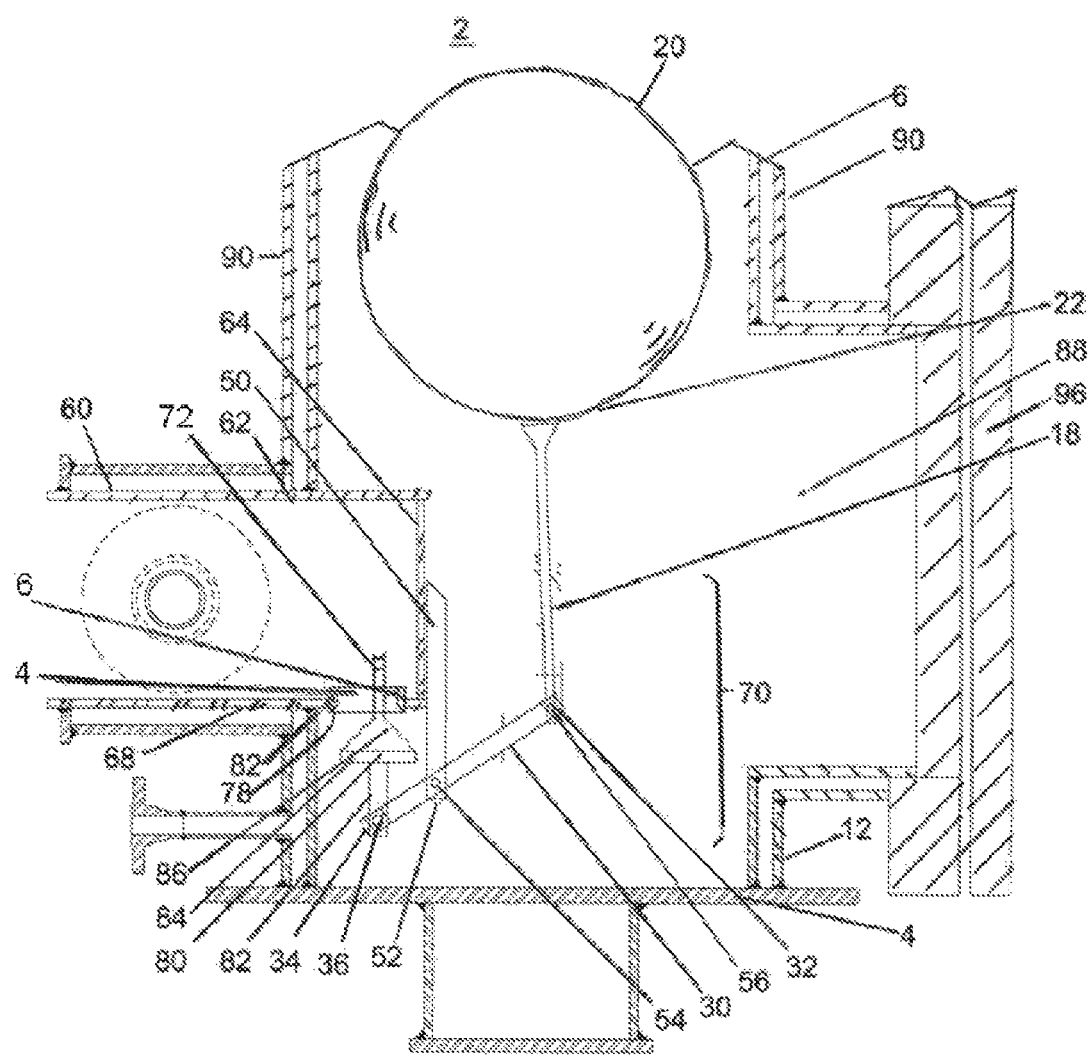
FIG. 2 depicts a partial cross-sectional detailed view of an embodiment of the sulfur trap fulcrum and lever system with the nozzle insert disengaged from the sulfur outlet.

Still referring to FIG. 1, and referring additionally to FIG. 2, a sulfur outlet 74 is provided at a lower surface 68 of outlet pipe 60 intermediate closed pipe end 64 and wall 6. Outlet 74 includes outlet wall 76 fixedly attached to pipe 60. Outlet wall 76 has a lower stopple-receiving surface 78. In the exemplary embodiment, stopple-receiving surface 78 is cylindrical.

In an exemplary embodiment, surface 78 is beveled at an angle to wall 76 such that an angle of less than 90 degrees is formed in relation to outer surface 82 of outlet wall 76.

A float 20 is provided in chamber 2. Float 20 is constructed to be of a density such that float 20 is buoyant in liquid sulfur and further of such density that the weight of float 20 is sufficient to bias a stopple 80 into stopple-receiving surface 78 of outlet 74 when no liquid sulfur or a level of liquid sulfur (not shown) less than a predetermined volume is contained within chamber 2. In an exemplary embodiment, float 20 is a hollow metal sphere. Alternative shapes and materials of float 20 may be utilized.

A fulcrum and lever system 70 comprises a lever 30 having a lever float end 32 and a distal lever stopple end 34, connected to a fulcrum 50. Fulcrum 50 is connected to lever 30 intermediate lever float end 32 and lever stopple end 34.

A float rod 18 is affixed to lower surface 22 of float 20. Float rod 18 connects float 20 to lever 30 at lever float end 32.

Lever stopple end 34 extends proximate sulfur outlet 74. A stopple rod 82 is attached to lever 30 at lever stopple end 34. Stopple rod 82 extends upwardly from lever 30. Stopple rod 82 is pivotally attached to stopple end 34. Such pivotal connection is structured to allow pivot of lever 30 in relation to stopple rod 82 in a vertical plane. In an exemplary embodiment, pivotal connection is provided by pivot pin 36 extending through stopple rod 82 and lever stopple end 34.

Stopple 80 is provided on stopple rod 82 distal lever stopple end 34. Stopple 80 comprises a stopple body 84 having a conical upper surface 86. Stopple upper surface 86 is constructed and sized to sealing engage stopple receiving surface 78. A stopple guide rod 72 extends upwardly from stopple body 80. Guide rod 72 extends through outlet 74 distal lever stopple end 34. Guide rod 72 is relatively thin in relation to outlet 74. Guide rod 72 is sized and constructed to continually extend through outlet 74 whether stopple 80 is engaged with or disengaged from outlet 74. By having guide rod 72 continually extending through outlet 74, stopple 80 is continually slidably connected to outlet 74 thereby providing sliding insertion of stopple 80 in outlet 74 when stopple 80 is raised by lever 30.

Fulcrum 50 is fixedly connected to pipe end 64. Fulcrum 50 comprises an elongated member extending downwardly from pipe end 64 within chamber 2. Fulcrum 50 is connected to lever 30 distal outlet pipe 60 at fulcrum tip 52. Lever 30 is pivotally connected to fulcrum tip 52 to allow each of lever stopple end 34 and lever float end 32 to move vertically, but to have limited ability to move in a horizontal plane. In an exemplary embodiment, pivotal connection is provided by pivot pin 54 extending through lever 30 and fulcrum tip 52.

Float rod 18 is pivotally connected to lever 30 at lever float end 32. Such pivotal connection is structured to allow pivot of lever 30 in relation to float rod 18 in a vertical plane responsive to upward or downward movement of float 20. In an exemplary embodiment, pivotal connection of float rod 18 and lever 30 is provided by lever float pin 56 extending through lever float end 32 and float rod 18.

Fulcrum and lever system 70 is constructed and sized in relation to chamber 2, stopple-receiving surface 78, and float 20 such that upward movement of float 20 will bias stopple 80 downward and away from stopple-receiving surface 78, and further that downward movement of float 20 will bias stopple 80 upward toward stopple-receiving surface 78. Upon sufficient upward bias of stopple 80, stopple 80 will sealingly engage stopple-receiving surface 78.

In an exemplary embodiment, the angle of conical surface 86 differs from the angle of stopple-receiving surface 78 to enhance sealing engagement of conical surface 86 with stopple-receiving surface 78.

A heat jacket 90 comprising an outer shell encapsulates exterior surfaces of chamber 2. Heat jacket inlet 92 allows for introduction of steam or other heating fluids into heat jacket 90. A heat jacket outlet 94 is provided for discharge of steam or other heating fluid. Heat jackets 90 are known in the art.

An opening 88 is provided in chamber 2. Opening 88 is covered by a removable sealing flange 96. Opening 88 allows access to chamber 2 for cleaning and maintenance.

An inlet pipe 98 is provided in chamber 2. A removable flange 28 is provided to seal pipe 98. Inlet pipe 98 allows access to chamber 2 for inserting a rod or other instruments for cleaning and maintenance.

An inner ring 24 is provided on chamber wall 6. Inner ring 24 is provided to support a screen 38. Inner ring 24 and screen 38 are provided below inlet opening 42 and above float 20. Screen 38 functions to screen solid-phase materials, including solid-phase sulfur, in the process stream.

In the exemplary embodiment depicted, inlet pipe 40 is positioned above outlet pipe 60. Float 20 and fulcrum and lever system 70 are so arranged and constructed within chamber 2 to allow liquid flowing into chamber 2 to accumulate in chamber 2 and, upon accumulation of liquid sulfur to a determined level, to cause float 20 to rise, thereby causing lever 30 to rotate in a vertical plane at fulcrum tip 52 and further causing lever stopple end 34 to rotate downward to disengage stopple 80 from stopple-receiving surface 78. Sufficient vertical clearance is provided above float 20 to allow float 20 to move upwardly and downwardly without engaging screen 38.

Referring to FIG. 2, stopple guide rod 72 is sized and constructed to extend through outlet 74 when stopple 80 is disengaged from stopple-receiving surface 78. Accordingly, stopple 80 is continually maintained in a position wherein it will extend toward outlet 74 when moved upward, even though stopple rod 82 is pivotally attached to lever 30.

Conical surface 86 of stopple 80, in cooperation with beveled stopple-receiving surface 78, functions to allow stopple 80 to be centered in outlet 74. More particularly, the inclined conical surface 86 is slidable along beveled stopple-receiving surface 78 until stopple 80 is centered into and in sealing contact with stopple-receiving surface 78.

Operation

In operation, a process stream (not shown) comprising a liquid-gas mixture process stream, and from time-to-time including solid-phase precipitate, is transmitted to chamber 2 through inlet pipe 40. As flow through pipe 40 contains a gas phase of the process stream, gas components are naturally circulated into and out of chamber 2 through pipe 40. Liquid-phase process stream components, generally sulfur (not shown) falls through screen 38 downward in chamber 2. Particulate matter exceeding opening sizes of screen 38 are retained on screen 38.

As liquid accumulates in chamber 2, chamber 2 partially fills and from time to time reaches a level to cause float 20 to float in the liquid sulfur. As the liquid level increases float 20 will float upward and pull lever float end 32 of lever 30 upward. Upon upward movement of lever float end 32, lever 30 will rotate in the vertical plane at fulcrum tip 52. As lever float end 32 is raised, lever stopple end 34 is lowered. Upon lowering level stopple end 34, stopple 80 is disengaged from stopple-receiving surface 78, allowing liquid sulfur contained within chamber 2 to drain from chamber 2 through outlet 74 and outlet pipe 60.

As liquid is discharged from chamber 2 through outlet pipe 60, float 20 lowers, thereby causing lever end 32 to move downward, lever 30 to rotate about fulcrum tip 52, and lever stopple end 34 to move upward until stopple 80 sealingly engages stopple-receiving surface 78.

Introduction of a process stream may be conducted continuously or intermittently. If process stream flow is halted, the liquid sulfur contained in sulfur trap 10 will be maintained in then-current condition. As process stream is continually introduced, the accumulated liquid sulfur will create buoyancy pressure on float 20, forcing float 20 to rise, lever 30 to pivot, and stopple 80 to disengage from outlet 74. As liquid sulfur is discharged through outlet 74, the liquid sulfur level will decrease, the buoyancy pressure of liquid sulfur will lessen, and the weight of float 20 will cause float 20 to lower, thereby causing lever 30 to pivot and stopple 80 to engage outlet 74. Accordingly, operation as described herein is continuous with continuous introduction of liquid sulfur into sulfur trap 10, and is interrupted at then-current status if introduction of process stream into chamber 2 ceases.

Steam or a heated gas is circulated through heat jacket 90, by means of heat jacket inlet 92, to maintain the temperature of chamber 2 at a predetermined level and to thereby maintain the sulfur received in the chamber 2 in a liquid phase. Heat jacket operation as well as standard cleaning and maintenance procedures are known in the art.

Method

Figure 3:
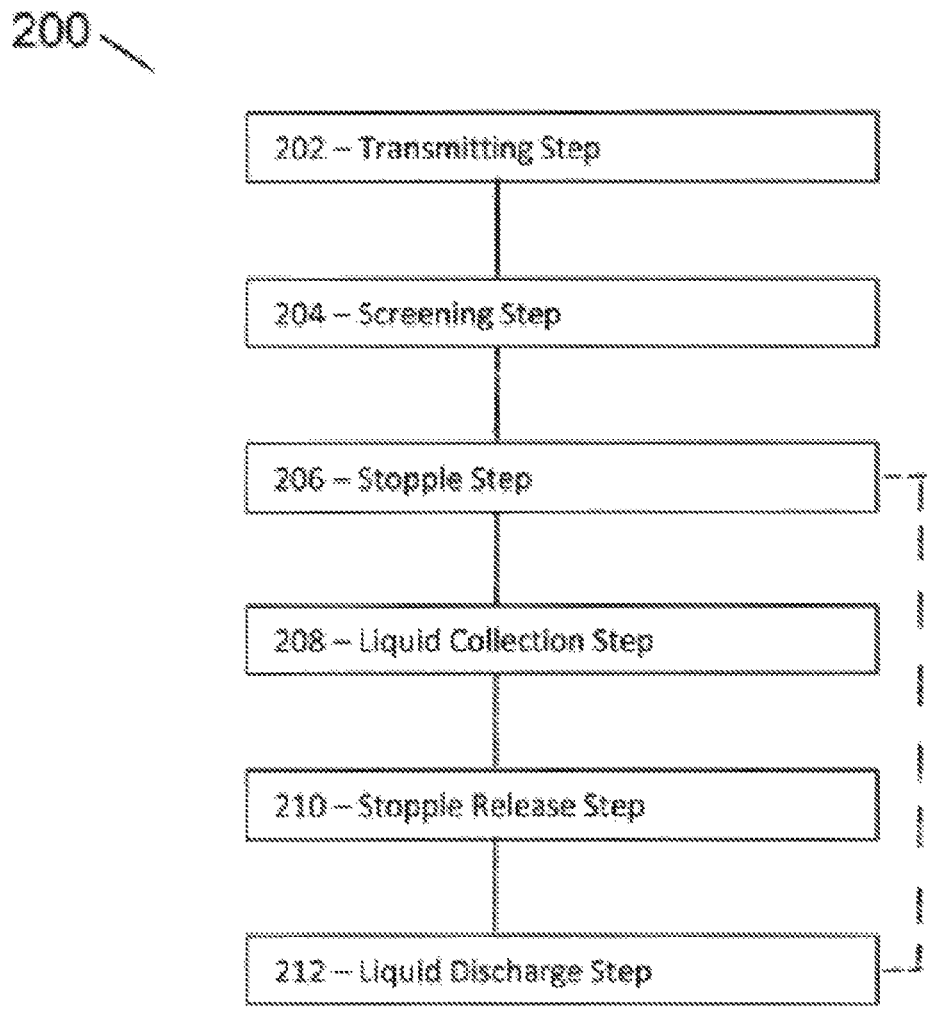
FIG. 3 depicts an embodiment of a method of the present invention.

Referring to FIG. 3, a method 200 of separating liquid sulfur from a process stream containing a mixture of liquid sulfur and gas-phase components includes:

A transmitting step 202 of transmitting the process stream into chamber 2;

A screening step 204 of screening particulate matter from the process stream by means of screen 38;

A stopple step 206 of sealing outlet 74 of chamber 2 by float 20 connected to lever float end 32 of a fulcrum and lever system 70 wherein the weight of float 20 biases stopple 80, which is connected to stopple end 34 of fulcrum and lever system 70, into stopple-receiving surface 78 of outlet 74;

A liquid collection step 208 of collecting liquid sulfur in chamber 2;

A stopple release step 210 of disengaging stopple 80 from outlet 74 of chamber 2 as a result of movement of float 20 responsive to pressure of accumulated liquid sulfur in chamber 2, such movement biasing float 20 upward, thereby pulling float end 32 of fulcrum and lever system 70 upward, and thereby pulling stopple 80 downward and disengaging stopple 80 from stopple-receiving surface 78; and A liquid discharge step 212 of discharging liquid sulfur from chamber 2 through outlet 74, such step continuing until sufficient liquid sulfur is discharged that the amount of liquid sulfur contained in chamber 2 is sufficiently reduced that float 20 is lowered, resulting in repetition of stopple step 206 as the weight of float 20, with lesser buoyancy bias because of reduced liquid sulfur within chamber 2, causes float 20 to fall until stopple 80 again sealingly engages outlet 74.

It will be noted that steps 206, 208, 210 and 212 are continuous steps during periods that liquid sulfur is received in sulfur trap 10.

The exemplary method 200 can be practiced without screening step 204 with less desirable results.

Second Exemplary Embodiment

Figure 4:
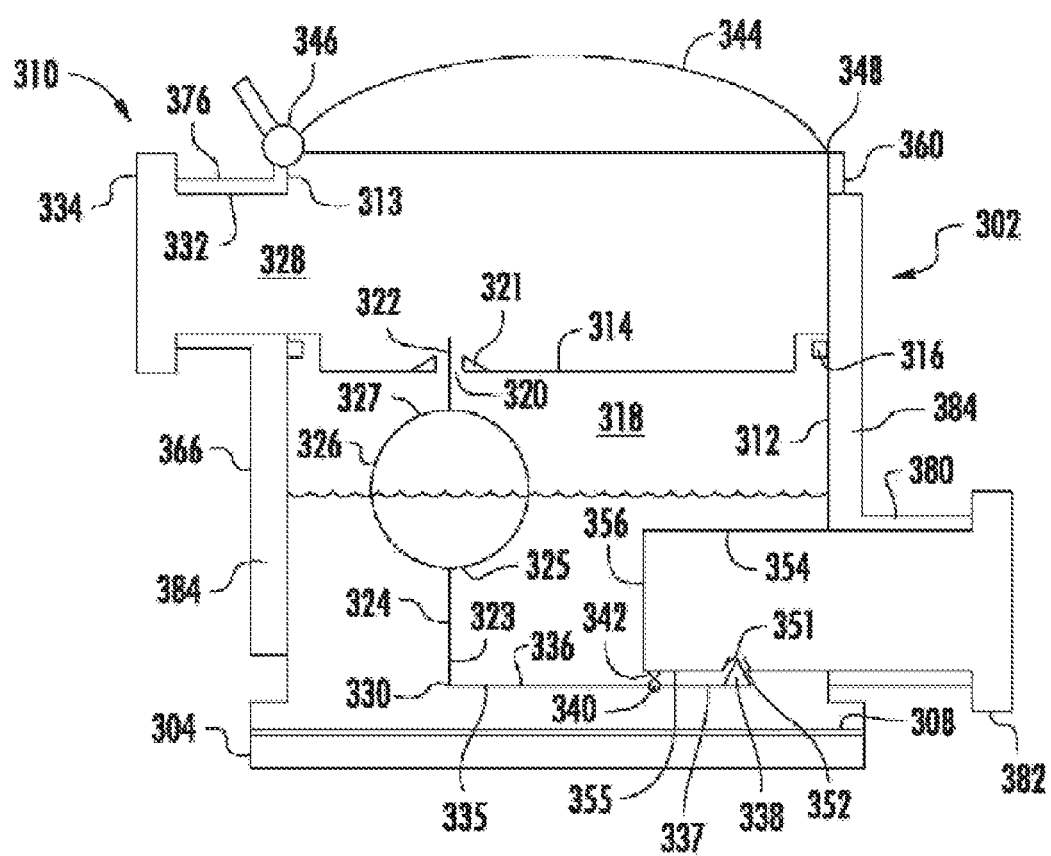
FIG. 4 depicts a cross-sectional view of an embodiment of the liquid trap of the present invention.

Referring to FIG. 4, the liquid trap 310 of the present invention is depicted in a cross-sectional drawing. The liquid trap 310 includes a cylindrical vessel 302, having a bottom 304 and a vertically oriented, cylindrical wall 312. A horizontal filter screen 314 is disposed in vessel 302. Filter screen 314 rests atop a mounting ring 316, which extends radially inward from an inner surface of cylindrical wall 312. A guide orifice 320 is provided through filter screen 314.

A float 326 is located in a chamber 318 beneath the filter screen 314. Float 326 depicted is spherical; however, an alternative shape of float 326 may be utilized. Float 326 is constructed of such density that it will float in the liquid that gathers in liquid trap 310 during operation.

A guide rod 322 is affixed to float 326. Guide rod 322 extends outwardly from upper surface 327 of float 326 through guide orifice 320. Horizontal movement of guide rod 322 is limited by orifice wall 321 of guide orifice 320 thereby maintaining float 326 in a generally upright orientation.

A lower rod 324 is affixed to lower surface 325 of float 326. Lower rod 324 connects float 326 to lever 336. Lower rod 324 is rotatably connected to lever 336 by means of a ball joint 330 at the lever end 323 of lower rod 324 distal to the float 326. Lower rod 324 also serves to maintain float 326 in an orientation such that guide rod 322 is always extending substantially upwards. In an alternative embodiment, other rotating connection of lower rod 324 and lever 336 may be provided, such as a pin and eyelet (not shown).

Still referring to FIG. 4, an inlet 328 is provided near the upper end 313 of chamber 318 in cylindrical wall 312. Inlet 328 is connected to inlet pipe 332. Inlet pipe 332 is connected to an inlet pipe flange 334. Inlet pipe flange 334 is connected to a source (not shown) of liquid-gas mixture. Inlet pipe 332 provides fluid communication between chamber 318 and the liquid-gas mixture source.

A liquid-gas two-phase mixture, such as molten sulfur with associated gases, may be introduced into the liquid trap 310 through inlet 328 and inlet pipe 332. A rounded cap 344 is provided at the upper end 313 of cylindrical wall 312. Cap 344 sealingly engages with upper end 313 and is hingedly attached to cylindrical vessel 302. Hinge 348 attaches cap 344 to cylindrical vessel 302 distal a clasp 346. Cap 344 is provided with clasp 346 to allow selective attachment of cap 344 to upper end 313 of cylindrical wall 312 in closed position as desired. Cap 344 may be rotated about the hinge 348 to expose the interior of cylindrical vessel 302 to allow access to inside of liquid trap 310 for inspection, cleaning, or the like.

In an alternative embodiment, cap 344 may be threadedly engaged with the interior surface of upper end 313 of cylindrical wall 312. The interior surface of upper end 313 of cylindrical wall 312 may be provided with threading (not shown) that corresponds to threading (not shown) located on an outer surface of a lower portion of cap 344. In this embodiment, rotation of cap 344 would allow access to the inside of liquid trap 310 for inspection, cleaning, or the like.

A discharge pipe 354 extends in a substantially horizontal orientation through cylindrical wall 312 near bottom 304. Discharge pipe segment 354 extends interior of cylindrical wall 312. Pipe end 356 of discharge pipe segment 354 is sealed.

A discharge orifice 352 is located in lower wall 355 of discharge pipe segment 354 intermediate cylindrical wall 312 and pipe end 356.

Discharge pipe segment 354 is spaced from bottom 304 of vessel 302 to provide a settlement basin 308 proximate vessel bottom 304. In operation, placement of discharge orifice 352 above settlement basin 308 allows solids to settle in basin 308, preventing their flow into discharge pipe 354.

Figure 5:
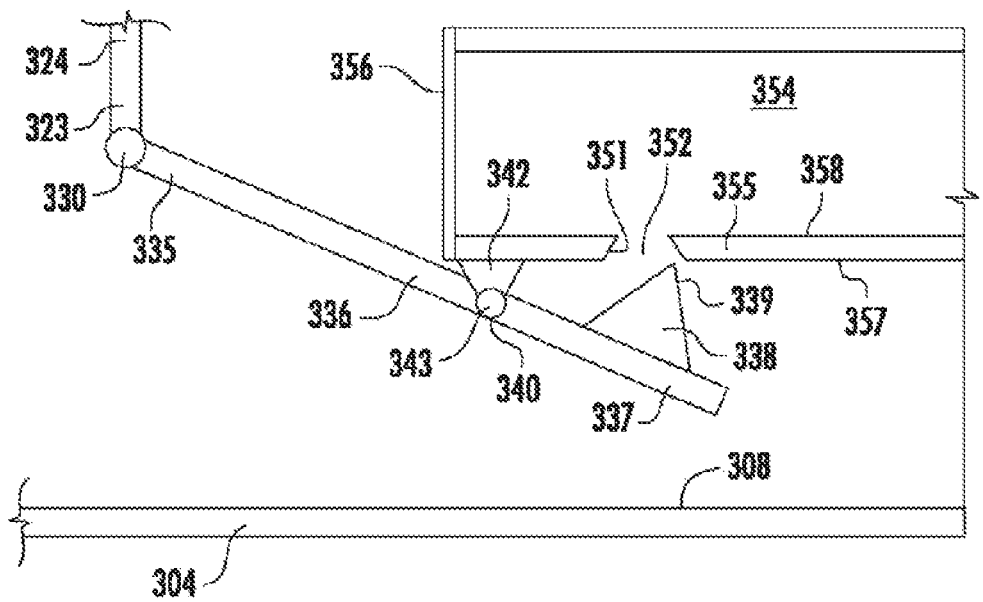
FIG. 5 depicts a detailed view of an embodiment of the fulcrum and lever system allowing fluid communication between the chamber and the discharge pipe.
Figure 6:
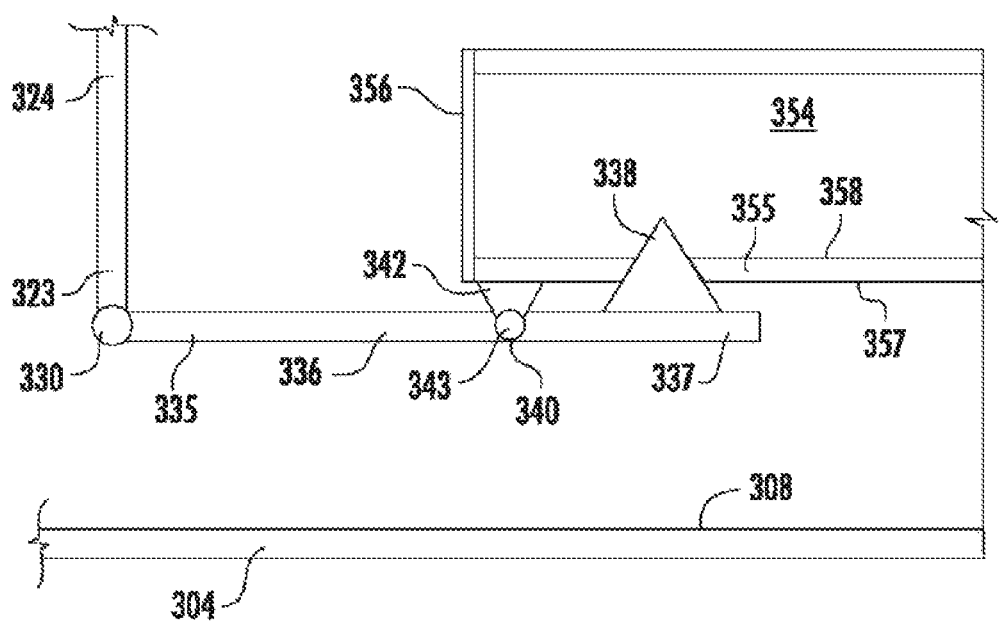
FIG. 6 depicts a detailed view of an embodiment of the fulcrum and lever system with the nozzle insert sealingly engaged with the discharge orifice.

Referring to FIGS. 5 and 6, an orifice edge 351 of discharge orifice 352 is tapered such that the orifice diameter is larger on an outer surface 357 of discharge pipe 354 and smaller on an inner surface 358 of discharge pipe 354. Tapered orifice edge 351 facilitates sealing engagement of discharge orifice 352 upon insertion of a nozzle insert 338.

Discharge orifice 352 provides selective fluid communication between chamber 318 and discharge pipe 354. Discharge pipe flange 382 is connected to discharge pipe 354 external of chamber 318 at a discharge end of discharge pipe 354 distal from discharge orifice 352. Discharge pipe flange 382 may be used to connect discharge pipe 354 to a piping system (not shown) or receptacle (not shown).

A fulcrum 342 is attached to lower wall 355 of discharge pipe segment 354 proximate pipe end 356. Fulcrum connector 343 is provided distal pipe lower wall 355. Lever 336 is rotatably attached to fulcrum 342 at lever pivot point 340 by the fulcrum connector 343. Lever pivot point 340 and fulcrum connector 343 are intermediate lever float end 335 and lever insert end 337. Nozzle insert 338 is fixedly attached to lever insert end 337 proximate discharge orifice 352. Nozzle insert 338 is positioned and oriented such that nozzle insert 338 will sealingly engage discharge orifice 352 upon rotation of lever 336 about pivot point 340 in the appropriate direction. Lever 336 float end 335 is attached to lower rod 324 by means of a ball joint 330 or other connector (not shown).

Lever 336 is rotatably attached to a lower point of fulcrum 342 at lever pivot point 340. Lever 336 and nozzle insert 338 are sized, constructed, and positioned such that nozzle insert 338 sealingly engages discharge orifice 352 when lever insert end 337 is rotated upwardly toward discharge pipe 354.

Referring to FIG. 4, a gas discharge outlet 360 is provided in wall 312 proximate upper wall end 313 distal inlet 328. Gas discharge outlet 360 is connected to a gas discharge line (not shown) for transport of gas from chamber 318. Shell members 366, 376, and 380 are provided around the cylindrical wall 312, inlet pipe 332, and discharge pipe 354 to provide for a steam jacket, if necessary. Shell members 366, 376, and 380 are constructed to allow for flow of steam or other fluid in the annular space 384 intermediate shell members 366, 376, and 380 and corresponding components of liquid trap 310.

In an alternate embodiment, engagement edge 339 of nozzle insert 338 may be beveled (not shown) to facilitate seating of nozzle insert 338 with tapered orifice edge 351 of discharge orifice 352.

Operation

In operation, a liquid-gas mixture (not shown) is received into chamber 318 through inlet pipe 332. Liquid contained in the mixture is induced by gravity to flow through the filter screen 314, where any large particles present are segregated from the liquid. Gas contained in the mixture is vented through gas discharge outlet 360.

As liquid accumulates in the lower portion of chamber 318, accumulated liquid displaces float 326 upwardly. Float 326 is constructed with such an average density to float in the liquid contained in the mixture. Upward displacement of float 326 raises lower rod 324 and float end 335 of lever 336, causing lever 336 to pivot at pivot point 340, displacing nozzle end 337 of lever 336 and nozzle insert 338 downward, as shown in FIG. 5. When nozzle insert 338 is moved downward, liquid is allowed to flow from chamber 318 through discharge pipe 354. Liquid in chamber 318 is thus allowed to flow through discharge orifice 352 through discharge pipe 354 to a storage tank or other receptacle (not shown).

As liquid is discharged from chamber 318, the lower level of liquid in chamber 318 allows float 326 to move downward. Downward displacement of float 326 lowers lower rod 324 and float end 335 of lever 336, causing lever 336 to pivot at pivot point 340, displacing nozzle end 337 of lever 336 and nozzle insert 338 upward. When nozzle insert 338 is moved upward, liquid flow through discharge orifice 352 is reduced. When nozzle insert 338 is moved upward a sufficient distance to engage edge 351 of discharge orifice 352, further liquid flow through discharge orifice 352 is prevented. The flow of liquid into discharge pipe 354 continues during the period that float 326 is displaced upward a sufficient amount to displace the nozzle insert 338 from sealed engagement with discharge orifice 352.

In an exemplary embodiment, float 326, lever 336, discharge orifice 352 and nozzle insert 338 are constructed and positioned such that nozzle insert 338 sealingly engages discharge orifice 352 when the surface level of liquid in chamber 318 is not sufficient to displace float 326 upward. Nozzle insert 338 will disengage from discharge orifice 352 to allow fluid flow only when the surface level of liquid in chamber 318 is sufficient to displace float 326 upward. As liquid level begins to decrease, nozzle insert 338 will re-engage the discharge orifice 352 as the float 326 lowers with liquid level before the liquid level reaches the discharge orifice 352 in the lower wall 355 of the discharge pipe 354. Therefore, a liquid seal will be maintained at all times when nozzle insert 338 is disengaged from discharge orifice 352, which prevents associated gases from escaping with the liquid to the discharge pipe 354.

The extent of lowering of float 326 in chamber 318 is limited by the positioning of nozzle insert 338 and discharge orifice 352 in that the seating of nozzle insert 338 in discharge orifice 352 prevents further upward movement of lever insert end 337 and further lowering of lever float end 335. Float 326 continues to be held upright by guide rod 322 positioned in guide orifice 320.

If necessary, steam may be continually circulated through the annular spaces 384 between shell members 366, 376, and 380 and cylindrical wall 312, inlet pipe 332, and discharge pipe 354 to maintain the temperature within liquid trap 310. Steam inlets and steam outlets are disposed in shell members 366, 367, and 380. Steam source (not shown) and pump (not shown) for circulation may be connected by hoses to said inlets and outlets.

As required for cleaning and to remove coagulated material or buildup, cap 344 may be opened.

The foregoing description of the invention illustrates an exemplary embodiment thereof. Various changes may be made in the details of the illustrated construction and process within the scope of the appended claims without departing from the teachings of the invention. The present invention should only be limited by the claims and their equivalents.

The invention claimed is:

1. A sulfur trap for separation of liquid sulfur from a process stream comprising:
  a chamber;
  a chamber fluid inlet;
  a chamber gas outlet;
  a chamber liquid outlet; and
  a chamber liquid level control system;
  wherein:
    said chamber liquid outlet is disposed below said chamber fluid inlet and said chamber gas outlet;
    said chamber liquid outlet comprises a discharge orifice; and
    said chamber liquid level control system comprises:
      a float;
      a fulcrum;
      a nozzle insert; and
      a lever comprising a float end and a nozzle insert end;
    wherein:
      said lever is pivotally connected to said fulcrum intermediate said float end and said nozzle insert end;
      said float is attached to said lever float end;
      said nozzle insert is attached to said lever nozzle insert end;
      rise of said float raises said lever float end and lowers said nozzle insert end via pivoting of said lever about said fulcrum;
      fall of said float lowers said lever float end and raises said nozzle insert end via pivoting of said lever about said fulcrum;
      said chamber liquid level control system operates to engage said nozzle insert with said discharge orifice, via upward bias of said nozzle insert toward said discharge orifice, when a level of a liquid within said chamber is below a desired height, to prevent fluid flow out of said chamber liquid outlet via said discharge orifice; and
      said chamber liquid level control system operates to disengage said nozzle insert from said discharge orifice, via downward bias of said nozzle insert away from said discharge orifice, when said level of said liquid within said chamber is above a desired height, to allow gravitational flow of at least a portion of said liquid out of said chamber liquid outlet via said discharge orifice;
  wherein:
    said chamber liquid outlet comprises a substantially horizontally oriented outlet pipe extending into said chamber; and
    said outlet pipe comprises a lower wall comprising said discharge orifice.

2. The sulfur trap of claim 1, wherein said discharge orifice comprises a beveled nozzle insert engagement surface and said nozzle insert comprises a conical discharge orifice engagement surface.

3. The sulfur trap of claim 1, wherein said sulfur trap comprises a filter screen disposed substantially horizontally within said chamber.

4. The sulfur trap of claim 3, wherein:
  said filter screen comprises an opening extending therethrough;
  said float comprises a guide rod extending vertically upward therefrom; and
  said guide rod extends through said filter screen opening, whereby said guide rod maintains said float in a substantially upright orientation.

5. The sulfur trap of claim 1, wherein said fulcrum is fixedly connected to said outlet pipe lower wall.

6. The sulfur trap of claim 1, wherein said float is attached to said lever float end by a float rod.

7. The sulfur trap of claim 6, wherein said float rod is rotatably attached to said lever float end.

8. A method of separating liquid sulfur from a process stream containing liquid sulfur and gases, comprising:
  providing a said sulfur trap comprising:
    a chamber;
    a chamber fluid inlet;
    a chamber gas outlet;
    a chamber liquid outlet; and
    a chamber liquid level control system;
    wherein:
      said chamber liquid outlet is disposed below said chamber fluid inlet and said chamber gas outlet;
      said chamber liquid outlet comprises a discharge orifice; and
      said chamber liquid level control system comprises:
        a float;
        a fulcrum;
        a nozzle insert; and
        a lever comprising a float end and a nozzle insert end;
      wherein:
        said lever is pivotally connected to said fulcrum intermediate said float end and said nozzle insert end;
        said float is attached to said lever float end;
        said nozzle insert is attached to said lever nozzle insert end;
        rise of said float raises said lever float end and lowers said nozzle insert end via pivoting of said lever about said fulcrum;
        fall of said float lowers said lever float end and raises said nozzle insert end via pivoting of said lever about said fulcrum;
        said chamber liquid level control system operates to engage said nozzle insert with said discharge orifice, via upward bias of said nozzle insert toward said discharge orifice, when a level of a liquid within said chamber is below a desired height, to prevent fluid flow out of said chamber liquid outlet via said discharge orifice;
        said chamber liquid level control system operates to disengage said nozzle insert from said discharge orifice, via downward bias of said nozzle insert away from said discharge orifice, when said level of said liquid within said chamber is above a desired height, to allow gravitational flow of at least a portion of said liquid out of said chamber liquid outlet via said discharge orifice;
        said chamber liquid outlet comprises a substantially horizontally oriented outlet pipe extending into said chamber; and
        said outlet pipe comprises a lower wall comprising said discharge orifice; and
  introducing a fluid flow of said process stream into said sulfur trap.

9. The method of claim 8, wherein said discharge orifice comprises a beveled nozzle insert engagement surface and said nozzle insert comprises a conical discharge orifice engagement surface.

10. The method of claim 8, wherein said sulfur trap comprises a filter screen disposed substantially horizontally within said chamber.

11. The method of claim 10, wherein:
said filter screen comprises an opening extending there through;
said float comprises a guide rod extending vertically upward therefrom; and
said guide rod extends through said filter screen opening, whereby said guide rod maintains said float in a substantially upright orientation.

12. The method of claim 8, wherein said fulcrum is fixedly connected to said outlet pipe lower wall.

13. The method of claim 8, wherein said float is attached to said lever float end by a float rod.

14. The method of claim 13, wherein said float rod is rotatably attached to said lever float end.

* * * * *